(12) United States Patent
Peutl et al.

(10) Patent No.: US 11,117,699 B2
(45) Date of Patent: Sep. 14, 2021

(54) ROTARY MACHINE FOR THE TREATMENT OF CONTAINERS

(71) Applicant: KRONES AG, Neutraubling (DE)

(72) Inventors: August Peutl, Woerth/Donau (DE); Johannes Strauss, Wolfsegg (DE); Veronika Bauer, Regensburg (DE)

(73) Assignee: KRONES AG, Neutraubling (DE)

( * ) Notice: Subject to any disclaimer, the term of this patent is extended or adjusted under 35 U.S.C. 154(b) by 187 days.

(21) Appl. No.: 16/059,894

(22) Filed: Aug. 9, 2018

(65) Prior Publication Data

US 2019/0071203 A1 Mar. 7, 2019

(30) Foreign Application Priority Data

Sep. 4, 2017 (DE) ...................... 10 2017 215 443.8

(51) Int. Cl.
| | |
|---|---|
| *B65C 9/04* | (2006.01) |
| *H02K 7/14* | (2006.01) |
| *G01D 5/00* | (2006.01) |
| *H02K 26/00* | (2006.01) |
| *B65C 9/06* | (2006.01) |
| *B65C 9/40* | (2006.01) |
| *G01D 5/04* | (2006.01) |
| *G01D 5/249* | (2006.01) |

(52) U.S. Cl.
CPC .................. *B65C 9/04* (2013.01); *B65C 9/06* (2013.01); *B65C 9/40* (2013.01); *G01D 5/00* (2013.01); *G01D 5/04* (2013.01); *G01D 5/2497* (2013.01); *H02K 7/14* (2013.01); *H02K 26/00* (2013.01)

(58) Field of Classification Search
CPC ................ B65C 9/04; B65C 9/06; B65C 9/40
USPC ......................................................... 156/566
See application file for complete search history.

(56) References Cited

U.S. PATENT DOCUMENTS

| | | | |
|---|---|---|---|
| 6,453,773 B1 * | 9/2002 | Mochizuki | ........... B23Q 16/025 74/813 C |
| 7,814,953 B2 | 10/2010 | Zacche' et al. | |
| 8,955,665 B2 | 2/2015 | Krämer et al. | |

(Continued)

FOREIGN PATENT DOCUMENTS

| | | |
|---|---|---|
| CN | 101913446 A | 12/2010 |
| CN | 103569433 A | 2/2014 |

(Continued)

OTHER PUBLICATIONS

English Translation of JP5294016 (Year: 2009).*

(Continued)

*Primary Examiner* — Matthew J Daniels
*Assistant Examiner* — Hana C Page
(74) *Attorney, Agent, or Firm* — McCoy Russell LLP

(57) ABSTRACT

A rotary machine for the treatment of containers is described. This rotary machine comprises a stationary underframe, a rotatable container table for receiving the containers, a motor designed as an internal rotor for direct drive of the container table, a bearing for supporting the container table and/or a non-rotatably connected supporting structure on the underframe radially outside the motor, and a rotary encoder for determining the rotational position of the container table. By positioning the rotary encoder radially outside the motor, the accuracy of the rotary position determination can be improved, especially for rotary machines with comparatively large pitch diameters and the accessibility of the rotary encoder for maintenance measures.

18 Claims, 2 Drawing Sheets

(56) References Cited

U.S. PATENT DOCUMENTS

| | | | | |
|---|---|---|---|---|
| 8,956,476 | B2* | 2/2015 | Stenner | B65C 9/0062 |
| | | | | 156/64 |
| 9,653,963 | B2* | 5/2017 | Schmid | H02K 11/21 |
| 2011/0001282 | A1* | 1/2011 | Taniguchi | F16C 37/007 |
| | | | | 269/55 |
| 2012/0269979 | A1 | 10/2012 | Weil et al. | |
| 2013/0255885 | A1* | 10/2013 | Carmichael | B65G 37/00 |
| | | | | 156/538 |
| 2015/0076939 | A1* | 3/2015 | Schroll | H02K 26/00 |
| | | | | 310/54 |

FOREIGN PATENT DOCUMENTS

| | | |
|---|---|---|
| CN | 104129172 A | 11/2014 |
| DE | 60019192 T2 | 2/2006 |
| DE | 102007031218 A1 | 1/2008 |
| DE | 102008012757 A1 | 9/2009 |
| DE | 102008038146 A1 | 2/2010 |
| DE | 102009005180 A1 | 7/2010 |
| DE | 102009035880 B4 | 2/2012 |
| DE | 102012204721 A1 | 9/2013 |
| DE | 202013008100 U1 | 12/2013 |
| DE | 102013218438 A1 | 3/2015 |
| EP | 1657162 A1 | 5/2006 |
| EP | 2897254 A2 | 7/2015 |

OTHER PUBLICATIONS

"Crossed Roller Bearings" retrieved on May 5, 2020 (Year: 2020).*
China National Intellectual Property Administration, Office Action and Search Report Issued in Application No. 201810935980.2, dated Jun. 2, 2020, 3 pages. (Submitted with Partial Translation).

* cited by examiner

ROTARY MACHINE FOR THE TREATMENT OF CONTAINERS

CROSS REFERENCE TO RELATED APPLICATION

This application claims priority to German Patent Application No. 10 2017 215 443.8 entitled "ROTARY MACHINE FOR THE TREATMENT OF CONTAINERS," filed on Sep. 4, 2017, the entire contents of which is hereby incorporated by reference in its entirety for all purposes.

TECHNICAL FIELD

The present disclosure concerns a rotary machine for the treatment of containers.

BACKGROUND AND SUMMARY

Generic rotary machines for the treatment of containers are known from DE 10 2013 218438 A1. For direct determination of the rotary position of the container table, i.e. without indirect speed measurement on the drive motor and/or an intermediate gear, a rotary encoder arranged centrally on the central axis of the rotary machine is used. The drive motor extends radially beyond the rotary encoder.

Since rotary machines with ever larger pitch diameters are required and rotary encoders are to be easily accessible for maintenance measures, there is an increasing need for more precise determination of the rotary position and improved access to drive components and rotary encoders of the container table.

The set object is solved with a rotary machine for the treatment of containers, the rotary machine comprising a stationary underframe, a rotatable container table for receiving the containers, a motor designed as an internal rotor for direct drive of the container table, a bearing for supporting the container table and/or a supporting structure connected to the container table in a rotationally fixed manner on the underframe radially outside the motor, and a rotary encoder for determining the rotational position of the container table, wherein the rotary encoder is arranged radially outside the motor.

By positioning the rotary encoder radially outside the motor, both the accuracy of the rotary encoder, in particular its angular resolution, and the accessibility of the rotary encoder for maintenance purposes can be improved compared to a rotary encoder centrally located in the motor area.

The rotary encoder consists of at least one sensor and at least one measuring standard scanned by the sensor.

An arrangement radially outside the motor is understood to mean that both sensor and measuring standard of the rotary body are arranged radially outside the stator and the rotor of the motor.

In the case of an internal rotor, the container table and/or its supporting structure are connected to the internal rotor of the motor.

The bearing is designed to support the axial and radial forces occurring in working operation.

The rotary encoder may be located in the area of the container table and/or the supporting structure at a radial distance of less than 0.2 m from the bearing. This enables a low-vibration and thus more accurate measurement of the rotational position due to increased mechanical stability in the vicinity of the bearing. The radial position of the bearing, for example, is determined by the center of the bearing cross-section.

The rotary encoder may include a stationary sensor. This simplifies the electrical power supply and the reading out of measurement data.

The rotary encoder may comprise a measuring standard for the sensor formed and/or fastened to the container table and/or supporting structure. The measuring standard can then be arranged at a suitable radial distance from the center axis of the container table.

Optionally the measuring standard is arranged below and/or radially outside the bearing. This increases the precision of rotary position determination and facilitates access to the rotary encoder for maintenance purposes.

The motor may be a torque motor. The bearing may be an axial radial bearing and optionally a cross roller bearing. This makes it possible, for example, to preload the bearing to minimize axial run-out deviations of the container table and/or parallelism deviations between container table and underframe.

The bearing may have an axial run-out deviation of no more than 0.015 mm from the container table and/or a parallelism deviation of no more than 0.15 mm from the container table and the underframe. This enables precise container treatment even with pitch diameters of at least 1.5 m.

The container table may have a pitch diameter of 1.5 to 2.5 m. This makes it possible to treat containers with comparatively high machine output. A measurement of the rotational position radially outside the motor is then particularly advantageous for precise treatment.

The bearing may be located radially between the motor and the pitch circle of the container table. The bearing is then located in particular radially inside drive motors for turntables to accommodate the containers. This favors a mechanically stable yet compact design of the rotary machine.

The rotary machine may be designed as a direct printing machine, labeller, capper, filler, stretch blow-molding machine, rinser, inspection machine or other container handling machine. The precise determination of the rotary position of the associated container table serves a precise interaction with the respective treatment units on the rotary machine. These can, for example, be stationary docked and/or circulate on the container table. In addition, access to the rotary encoder is facilitated, for example for checking and/or replacing the sensors and/or the measuring standard, depending on maintenance intervals.

The stator of the motor may be suspended and detachably attached to the underframe at the bottom. This facilitates maintenance work on the motor.

Optionally, the rotor of the motor is designed as a hollow shaft and/or surrounds a hollow shaft. The hollow shaft can then be used for media connections between the stationary part and the rotating part of the rotary machine.

Optionally, lines are then arranged within the hollow shaft for the supply of media, in particular for power supply, compressed gas supply or the like, of the container table and/or of a machine head connected to the container table in a rotationally fixed manner.

BRIEF DESCRIPTION OF THE FIGURES

Designs of the present disclosure are shown in drawings.

DETAILED DESCRIPTION

Figure 1:
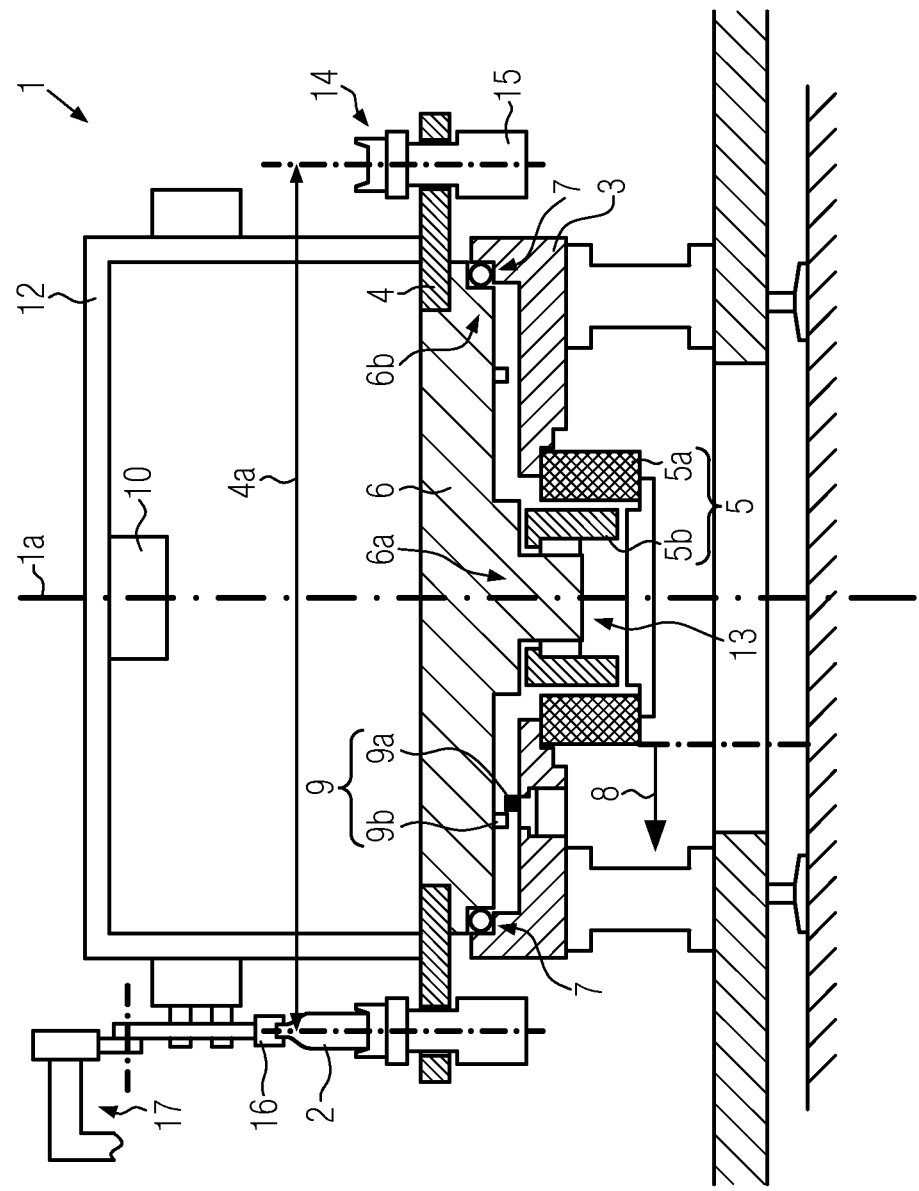
FIG. 1 shows a schematic longitudinal section through a rotary machine.

As FIG. 1 shows, the rotary machine 1 for the treatment of containers 2 comprises a stationary underframe 3, a rotatable container table 4 for receiving the containers 2 on a pitch circle 4a and a motor 5 designed as an internal rotor for direct drive of the container table 4, which can thus be rotated continuously about a central axis 1a of the rotary machine 1 in particular.

Motor 5 is in particular a torque motor with an external stator 5a and an internal rotor 5b.

The motor 5 is connected to the container table 4 by means of a supporting structure 6. This is only schematically indicated in FIG. 1. Supporting structure 6, for example, comprises a central connecting section 6a for rotationally fixed coupling to the rotor 5b. Furthermore, the supporting structure 6 may comprise an outer supporting section 6b for rotationally fixed coupling and support of the container table 4.

Supporting structure 6 is supported by means of an annular bearing 7 on the stationary underframe 3. Bearing 7 is in particular an axial/radial bearing for absorbing axial and radial forces during the treatment of containers 2.

Bearing 7 supports container table 4 and/or supporting structure 6 in an area 8 radially outside the motor 5, which is defined, for example, with respect to the outer circumference of stator 5a.

In the radially outer area 8 there is also a rotary encoder 9 for the container table 4. The rotary encoder 9 may comprise a sensor 9a that is stationary/connected to the underframe 3 and a measuring standard 9b for the sensor 9a formed/fastened to the container table 4 or to the supporting structure 6. The measuring standard 9a is a fully developed linear/angular scale with an origin recognizable by sensor 9a and may be scanned by sensor 9a without contact.

The sensor 9a is connected to a schematically indicated control 10 for the transmission of rotary position data of the container table 4. This is possible wireless or wired.

To simplify the media connection of a schematically indicated machine head 12 of rotary machine 1, the rotor 5b of motor 5 may comprise and/or enclose a central channel 13, which is only schematically indicated in FIG. 1. The central channel 13 is suitable for the media supply of the container table 4 and/or the machine head 12, while media lines, data lines or the like can be routed from the stationary to the rotating part of the rotary machine 1 in channel 13.

FIG. 1 also schematically shows turntable 14 for receiving the containers 2, individual drive motors 15 for the turntables 14 and centering bells 16 for clamping the containers 2 on the turntables 14 and a lift curve 17 for lowering the centering bells 16 on the containers 2.

Figure 2:
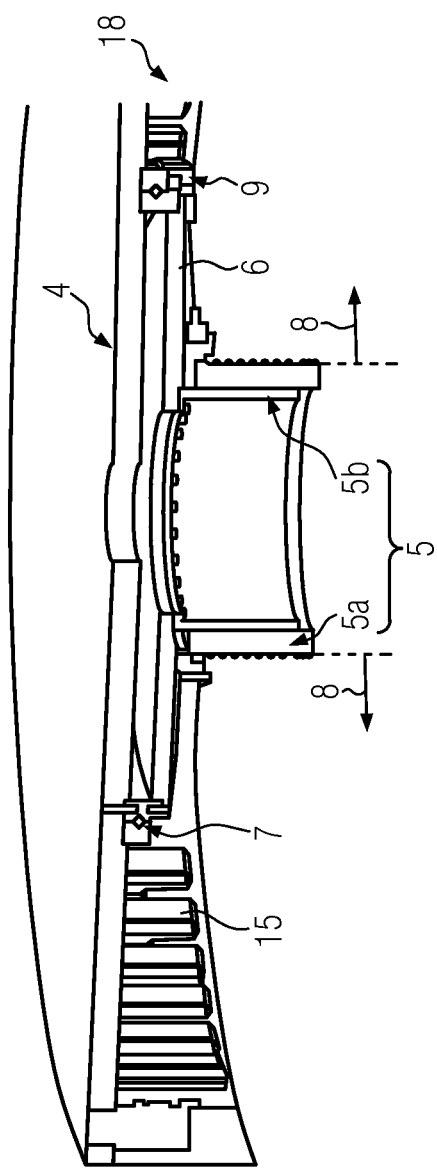
FIG. 2 shows a possible design of a container table with bearing and motor.

FIG. 2 shows a concrete design of a drive unit 18 of rotary machine 1 with container table 4, motor 5 with stator 5a and rotor 5b, supporting structure 6, bearing 7 and rotary encoder 9. Drive motors 15 for turntables 14 can also be seen.

Figure 3:
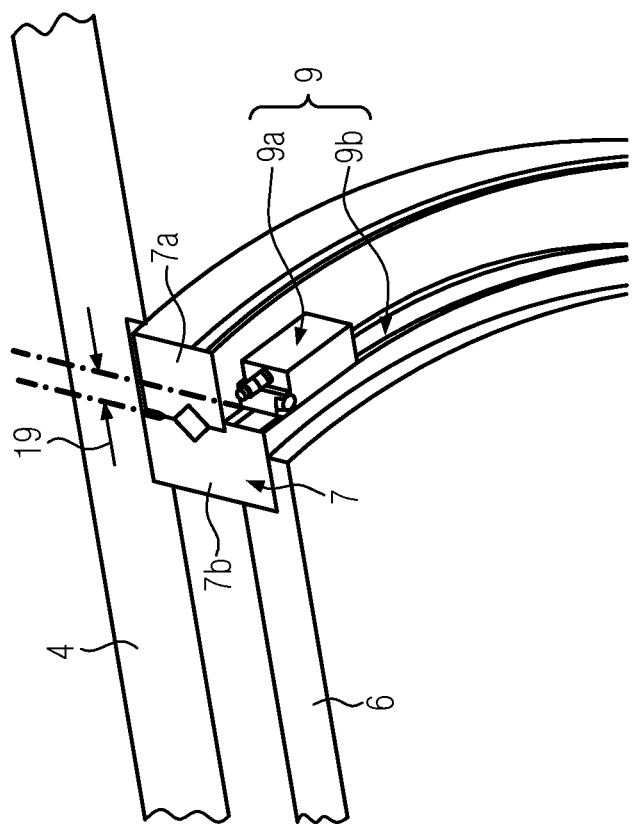
FIG. 3 shows a detailed view of the hopper table of FIG. 2 with a rotary encoder.

In FIG. 3 the area of the bearing 7 and the rotary encoder 9 can be seen in detail. Accordingly, the rotary encoder 9 may be arranged on bearing 7, in particular at a radial distance 19 from the center of the bearing cross-section of no more than 0.2 m.

The sensor 9a may be arranged stationary, for example on an outer bearing ring 7a, which is connected to the frame 3. At the supporting structure 6 or an inner bearing ring 7b of the bearing 7 connected to it, an associated measuring standard 9b is then formed for scanning by sensor 9a.

The measuring standard 9b may be arranged on a lateral cylinder surface facing outwards. Due to the arrangement of the rotary encoder 9 in the area 8 radially outside the motor 5, the measuring standard 9b enables a comparatively fine angular resolution for determining the rotary position of the container table 4.

As can be seen in FIG. 3 in particular, bearing 7 may be an axial radial bearing and in particular a preloadable cross roller bearing. In working operation, for example, bearing 7 absorbs the clamping force transmitted from the centering bells 16 to the containers 2 and the turntables 14.

The rotary encoder 9 may be a so-called singleturn absolute value encoder. The rotary encoder 9 optionally works according to the principle of an inductive encoder or a capacitive encoder. Depending on the mounting position of the rotary encoder 9, however, it can also work according to the principle of an optical encoder.

Sensor 9a of rotary encoder 9 is optionally accessible from below for maintenance, in particular for replacement.

The measuring standard 9b is optionally also accessible from below for maintenance measures, such as inspection and/or cleaning, from below and can also be replaced in a preferred embodiment.

The accuracy of the rotary encoder 9 may be ±20 µm absolute or better, i.e. referred to the origin of the measuring standard 9b.

The pitch circle 4a may have a diameter of at least 1.5 m and in particular at least 1.8 m.

By positioning the rotary encoder 9 in the range 8 radially outside the motor 5 and especially in the range of the bearing 7, as for example with a radial distance 19 of at most 0.2 m, a load-near connection of the rotary encoder 9 can be realized.

This allows, for example, the lowest natural load frequency in the range up to 10 Hz to be effectively suppressed. Furthermore, the motor 5, which is designed as an internal rotor, enables resonant frequencies in the range above 100 Hz to be suppressed due to the comparatively low motor inertia. Control loops for suppressing natural resonances in the drive unit 18 of the rotary machine 1 can therefore operate more effectively, for example by primarily controlling an amplitude range from 10 Hz to 100 Hz.

For this reason, an arrangement of the rotary encoder 9 directly on bearing 7, as shown in FIG. 3, is particularly advantageous. The mounting of the sensor 9a on the stationary frame 3 simplifies both its electrical power supply and the transmission of measuring signals. In principle, however, the stationary/circumferential mounting of the sensor 9a/the measuring standard 9b could also be interchanged.

The motor 5 is optionally suspended from frame 3 or the supporting structure 6 of container table 4 in such a way that it is accessible from below for maintenance measures and can be removed downwards as a whole and/or in individual parts, for example the rotor 5b. It is then not necessary to dismantle the container table 4 and/or its supporting structure 6 above it.

For simplicity's sake, additional units for container treatment, which are, for example, docked in a stationary position to underframe 3, are not shown. The described drive unit 18 and the associated rotary position determination for the container table 4 can be used flexibly for different rotary machines for container treatment, for example for a direct printing machine, a labeller, a capper, a filler, a stretch blow-moulding machine, a rinser or an inspection machine.

The internal-rotor direct drive of container table 4, i.e. without an intermediate gear or the like, enables with the radially external rotary encoder 9 advantageous mechanical running characteristics with regard to concentricity, axial run-out and parallelism to the underframe 3 as well as a precise, simple and easy to maintain determination of the rotary position.

The invention claimed is:

1. A rotary machine for the treatment of containers, comprising: a stationary underframe; a rotatable container table for receiving the containers; a motor comprising a rotor and a stator, and being designed as an internal rotor for directly driving the container table; a bearing for supporting the container table and/or a supporting structure connected thereto in a rotationally fixed manner on the underframe; and a rotary encoder for determining the rotational position of the container table, wherein the bearing and the rotary encoder are arranged radially outside the outer circumferences of the rotor and the stator of the motor, wherein the bearing comprises two concentric rings, one being a rotatable ring attached to the rotatable container table and the other being a stationary ring attached to the stationary underframe, wherein the rotary encoder includes a measuring standard and a sensor, with the measuring standard oriented on the bearing to permit access to the measuring standard from below the table so as to enable inspection and/or cleaning and/or replacement of the measuring standard.

2. The rotary machine according to claim 1, wherein the rotary encoder is arranged in the region of the container table and/or the supporting structure at a radial distance of less than 0.2 m from the bearing.

3. The rotary machine according to claim 1, wherein the sensor is a stationary sensor.

4. The rotary machine according to claim 3, wherein the measuring standard is located below and/or radially outside the bearing.

5. The rotary machine according to claim 1, wherein the motor is a torque motor.

6. The rotary machine according to claim 1, wherein the bearing is an axial-radial bearing.

7. The rotary machine according to claim 1, wherein the bearing has an axial run-out of at most 0.015 mm to the container table and/or a parallelism deviation of at most 0.15 mm to the container table and to the underframe.

8. The rotary machine according to claim 1, wherein the container table has a pitch diameter of 1.5 to 2.5 m.

9. The rotary machine according to claim 1, wherein the bearing is arranged radially between the motor and a pitch circle of the container table.

10. The rotary machine according to claim 1, wherein the rotary machine provides a rotary position determination for use of the rotary machine as a direct printing machine, labeller, capper, filler, stretch blow-molding machine, rinser or inspection machine.

11. The rotary machine according to claim 1, wherein the stator of the motor is suspended and detachably attached to the underframe such that the motor can be detached in a downward direction.

12. The rotary machine according to claim 1, wherein the rotor of the motor comprises and/or surrounds a central channel suitable for media supply of the container table and/or a machine head connected thereto through media lines or data lines routed from a stationary part of the rotary machine to a rotating part of the rotary machine.

13. The rotary machine according to claim 6, wherein the bearing is a cross roller bearing.

14. The rotary machine according to claim 12, wherein the lines arranged within the channel are for energy supply.

15. The rotary machine according to claim 4, wherein the bearing is an axial-radial bearing.

16. The rotary machine according to claim 1, wherein the sensor is a stationary sensor.

17. The rotary machine according to claim 6, wherein the bearing has an axial run-out of at most 0.015 mm to the container table and/or a parallelism deviation of at most 0.15 mm to the container table and to the underframe.

18. The rotary machine according to claim 5, wherein the rotor of the motor comprises and/or surrounds a central channel.

* * * * *